US008676515B2

(12) United States Patent
Long et al.

(10) Patent No.: US 8,676,515 B2
(45) Date of Patent: Mar. 18, 2014

(54) SYSTEM AND METHOD FOR DETECTING CLUTCH-RELATED FAULTS IN AN AUTOMATIC TRANSMISSION

(75) Inventors: Charles F. Long, Pittsboro, IN (US); Darren J. Weber, Indianapolis, IN (US); John William Edward Fuller, Preston Lancashire (GB)

(73) Assignee: Allison Transmission, Inc., Indianapolis, IN (US)

( * ) Notice: Subject to any disclaimer, the term of this patent is extended or adjusted under 35 U.S.C. 154(b) by 474 days.

(21) Appl. No.: 12/957,872

(22) Filed: Dec. 1, 2010

(65) Prior Publication Data
US 2011/0144925 A1   Jun. 16, 2011

Related U.S. Application Data

(60) Provisional application No. 61/287,031, filed on Dec. 16, 2009.

(51) Int. Cl.
*G01B 5/28* (2006.01)
*F16H 31/00* (2006.01)
*G06F 7/00* (2006.01)

(52) U.S. Cl.
USPC ............................. 702/35; 475/116; 701/51

(58) Field of Classification Search
USPC ........... 702/35, 33–34, 36, 44, 47, 50, 81, 84, 702/127, 138, 140, 150, 182–183, 185; 475/31, 72–73, 116, 127–128, 140, 475/216, 238, 327; 476/2, 9, 31, 64, 67; 477/34, 37–39, 70, 74, 77, 79, 83, 86, 477/166, 168, 171, 180; 701/51, 67
See application file for complete search history.

(56) References Cited

U.S. PATENT DOCUMENTS

| 4,838,126 | A   | 6/1989  | Wilfinger et al. ............. 477/129 |
| 6,030,310 | A   | 2/2000  | Greenwood et al. ............ 476/10 |
| 6,285,942 | B1* | 9/2001  | Steinmetz et al. .............. 701/67 |
| 6,292,732 | B1  | 9/2001  | Steinmetz et al. .............. 701/67 |
| 6,364,811 | B1  | 4/2002  | Hubbard et al. ............. 477/143 |
| 6,626,793 | B1  | 9/2003  | Greenwood ..................... 476/10 |
| 6,979,276 | B2  | 12/2005 | Murray ...................... 475/216 |
| 7,056,261 | B2  | 6/2006  | Fuller ............................. 477/37 |
| 7,103,463 | B2* | 9/2006  | Sah et al. ........................ 701/67 |

(Continued)

FOREIGN PATENT DOCUMENTS

WO   WO 97/40292   10/1997

OTHER PUBLICATIONS

International Search Report and the Written Opinion for International Application No. PCT/US2010/058705, dated Feb. 11, 2011, (12 pages).

(Continued)

*Primary Examiner* — Toan Le
(74) *Attorney, Agent, or Firm* — Barnes & Thornburg LLP

(57) ABSTRACT

A fault diagnostic method for an automatic transmission may include monitoring an operating state of a trim system configured to selectively supply clutch engagement pressure and exhaust to at least one clutch control valve, determining an expected operating state of the trim system based on current operating conditions of the transmission, and generating a fault signal if the monitored operating state of the trim system is different from the expected operating state of the trim system.

30 Claims, 7 Drawing Sheets

(56) References Cited

U.S. PATENT DOCUMENTS

| | | | |
|---|---|---|---|
| 7,160,226 B2 | 1/2007 | Fuller | 477/39 |
| 7,278,951 B2 | 10/2007 | Fuller | 476/9 |
| 7,318,786 B2 | 1/2008 | Greenwood et al. | 476/10 |
| 7,530,916 B2 | 5/2009 | Greenwood | 475/216 |
| 7,625,309 B2 | 12/2009 | Fuller | 476/10 |
| 2001/0041642 A1 | 11/2001 | Miyata | 475/216 |
| 2005/0043138 A1 | 2/2005 | Fuller | 477/37 |
| 2005/0143216 A1 | 6/2005 | Greenwood et al. | 476/10 |
| 2005/0211295 A1 | 9/2005 | Long et al. | 137/112 |
| 2006/0160656 A1 | 7/2006 | Dutson | 476/40 |
| 2006/0184303 A1 | 8/2006 | Long et al. | 701/51 |
| 2006/0201766 A1 | 9/2006 | Fuller | 192/3.51 |
| 2008/0085801 A1 | 4/2008 | Sedoni et al. | 475/72 |
| 2008/0146399 A1 | 6/2008 | Oliver et al. | 475/216 |
| 2008/0176709 A1 | 7/2008 | Wu et al. | 477/143 |
| 2009/0075772 A1 | 3/2009 | Ellis et al. | 475/31 |
| 2009/0253552 A1 | 10/2009 | Foster | 477/130 |
| 2011/0138898 A1 | 6/2011 | Long et al. | |
| 2011/0140017 A1 | 6/2011 | Long et al. | |
| 2011/0143882 A1 | 6/2011 | Long et al. | |
| 2011/0144872 A1 | 6/2011 | Long et al. | |

OTHER PUBLICATIONS

International Search Report and the Written Opinion for International Application No. PCT/US2010/060032, dated Feb. 11, 2011, (9 pages).

International Search Report and the Written Opinion for International Application No. PCT/US2010/056247, dated Jan. 21, 2011, (10 pages).

Torotrak Full toroidal variator (http://www.torotrak.com/IVT/works/variator.htm) 5 pages (accessed Sep. 24, 2009).

International Search Report and the Written Opinion for International Application No. PCT/US2010/058707, dated Feb. 1, 2011, (8 pages).

International Search Report and the Written Opinion for International Application No. PCT/US2010/056244, dated Jan. 21, 2011, (9 pages).

U.S. Appl. No. 61/286,974, filed Dec. 16, 2009, Long et al.
U.S. Appl. No. 61/286,984, filed Dec. 16, 2009, Long et al.
U.S. Appl. No. 61/287,003, filed Dec. 16, 2009, Long et al.
U.S. Appl. No. 61/287,031, filed Dec. 16, 2009, Long et al.
U.S. Appl. No. 61/287,038, filed Dec. 16, 2009, Long et al.

* cited by examiner

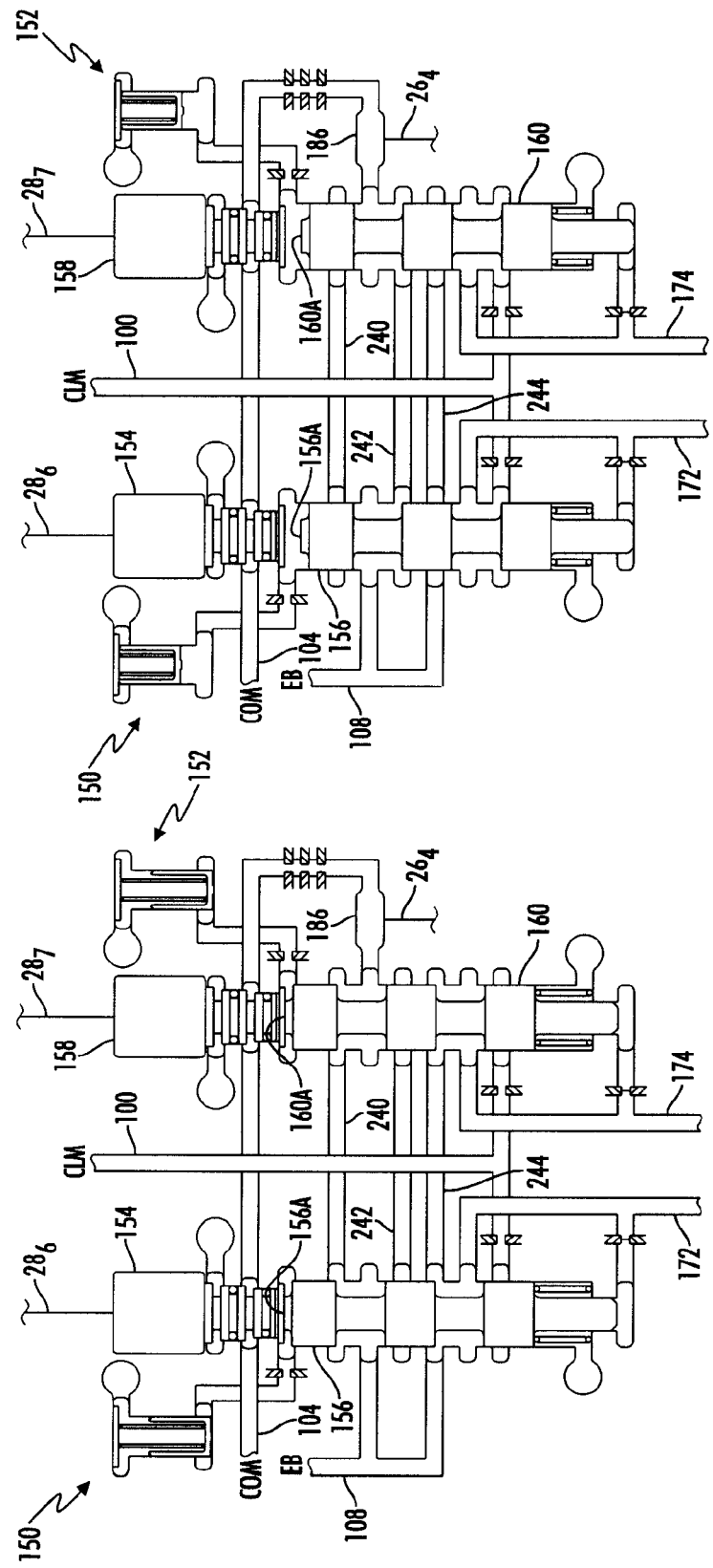

SYSTEM AND METHOD FOR DETECTING CLUTCH-RELATED FAULTS IN AN AUTOMATIC TRANSMISSION

CROSS-REFERENCE TO RELATED APPLICATION

This patent application claims priority to, and the benefit of, U.S. Patent Application Ser. No. 61/287,031, filed Dec. 16, 2009, the disclosure of which is incorporated herein by reference.

FIELD OF THE INVENTION

The present invention relates generally to automatic transmissions, and more specifically to systems and methods for detecting clutch faults in such transmissions.

BACKGROUND

Automatic transmissions may typically include one or more gear sets and a number of selectively engageable friction devices that cooperate together to transfer drive torque from a power plant to one or more loads. It is desirable to diagnose friction device-related fault or failure conditions in such transmissions.

SUMMARY

The present invention may comprise one or more of the features recited in the attached claims, and/or one or more of the following features and combinations thereof. A fault diagnostic method for an automatic transmission may comprise monitoring an operating state of a trim system configured to selectively supply clutch engagement pressure and exhaust to at least one clutch control valve, determining an expected operating state of the trim system based on current operating conditions of the transmission, and generating a fault signal if the monitored operating state of the trim system is different from the expected operating state of the trim system.

Generating a fault signal may comprise storing a trim system fault code in a memory device.

Determining an expected operating state of the trim system may comprise determining that the trim system should be in a first operating state when the transmission is in neutral. Generating a fault signal may comprise generating a neutral fault signal if the monitored operating state of the trim system is different from the first operating state of the trim system when the transmission is in neutral. Generating the neutral fault signal may comprise storing a neutral fault code in a memory device.

The transmission may have a number of different operating modes. Determining an expected operating state of the trim system may comprise determining that the trim system should be in a first operating state when the transmission is transitioning between adjacent ones of the number of different operating modes. Generating a fault signal may comprise generating a mode transition fault signal if the monitored operating state of the trim system is different from the first operating state of the trim system when the transmission is transitioning between adjacent ones of the number of different operating modes. Generating the mode transition signal may comprise storing a mode transition fault code in a memory device.

The at least one clutch control valve may comprise first and second clutch control valves. The method may further comprise monitoring an operating state of the first clutch control valve, determining an expected operating state of the first clutch control valve based on current operating conditions of the transmission, and generating a first clutch control valve fault signal if the monitored operating state of the first clutch control valve is different from the expected operating state of the first clutch control valve. Generating a first clutch control valve fault signal may comprise storing a first clutch control valve fault code in a memory device. Alternatively or additionally, the method may further comprise monitoring an operating state of the second clutch control valve, determining an expected operating state of the second clutch control valve based on current operating conditions of the transmission, and generating a second clutch control valve fault signal if the monitored operating state of the second clutch control valve is different from the expected operating state of the second clutch control valve. Generating a second clutch control valve fault signal may comprise storing a second clutch control valve fault code in a memory device.

The trim system may comprise a first trim valve having a first operating state in which the first trim valve supplies the clutch engagement pressure to the at least one clutch control valve via a first fluid passageway and a second operating state in which the first trim valve exhausts the first fluid passageway, a second trim valve having a first operating state in which the second trim valve supplies the clutch engagement pressure to the at least one clutch control valve via a second fluid passageway and a second operating state in which the second trim valve exhausts the second fluid passageway, and a first pressure switch fluidly coupled to one of the first and second trim valves such that the first pressure switch is in a first operating state when the first and second trim valves both supply the clutch engagement pressure to the first and second fluid passageways respectively and also when the first and second trim valves both exhaust the first and second fluid passageways respectively, and is otherwise in a second operating state different from the first operating state. Monitoring a state of the trim system may comprise monitoring the operating state of the first pressure switch and determining an expected operating state of the trim system may comprise determining an expected operating state of the first pressure switch.

Generating a fault signal may comprise storing a trim system fault code in a memory device if the monitored operating state of the first pressure switch is different from the expected operating state of the first pressure switch.

Determining an expected operating state of the trim system may comprise determining that the first pressure switch should be in the first operating state when the transmission is in true neutral. Generating a fault signal may comprise generating a true neutral fault signal if the first pressure switch is in the second operating state when the transmission is in true neutral. Generating the true neutral fault signal may comprise storing a true neutral fault code in a memory device.

Determining an expected operating state of the trim system may comprise determining that the first pressure switch should be in the first operating state when the transmission is in in-range neutral. Generating a fault signal may comprise generating an in-range neutral fault signal if the first pressure switch is in the second operating state when the transmission is in in-range neutral. Generating the in-range neutral fault signal may comprise storing an in-range neutral fault code in a memory device.

The transmission may have a number of different operating modes. Determining an expected operating state of the trim system may comprise determining that the first pressure switch should be in the first operating state when the transmission is transitioning between adjacent ones of the number of different operating modes. Generating a fault signal may comprise generating a mode transition fault signal if the first pressure switch is in the second operating state when the transmission is transitioning between adjacent ones of the number of different operating modes. Generating the mode transition fault signal may comprise storing a mode transition fault code in a memory device.

The at least one clutch control valve may comprise a first control valve fluidly coupled to the first trim valve via the first fluid passageway and also to first and second friction engagement devices, a second control valve fluidly coupled to the first and second trim valves via the first and second fluid passageways and also to a third friction engagement device, a second pressure switch fluidly coupled to the first control valve such that the second pressure switch is in a first operating state when the first control valve is de-stroked and is in a second operating state when the first control valve is stroked, and a third pressure switch fluidly coupled to the second control valve such that the third pressure switch is in a first operating state when the second control valve is de-stroked and is in a second operating state when the second control valve is stroked. The method may further comprise monitoring the operating state of the second pressure switch, determining an expected operating state of the second pressure switch based on current operating conditions of the transmission, and generating a first control valve fault signal if the monitored operating state of the second pressure switch is different from the expected operating state of the second pressure switch. Generating a first control valve fault signal may comprise storing a first control valve fault code in a memory device. Alternatively or additionally, the method may further comprise monitoring the operating state of the third pressure switch, determining an expected operating state of the third pressure switch based on current operating conditions of the transmission, and generating a second control valve fault signal if the monitored operating state of the third pressure switch is different from the expected operating state of the third pressure switch. Generating a second control valve fault signal may comprise storing a second control valve fault code in a memory device.

A system for detecting clutch-related faults in an automatic transmission may comprise a first trim valve having a first operating state in which the first trim valve supplies clutch engagement pressure to at least one clutch control valve via a first fluid passageway and a second operating state in which the first trim valve exhausts the first fluid passageway, a second trim valve having a first operating state in which the second trim valve supplies the clutch engagement pressure to the at least one clutch control valve via a second fluid passageway and a second operating state in which the second trim valve exhausts the second fluid passageway, and a first pressure switch fluidly coupled to one of the first and second trim valves such that the first pressure switch is in a first operating state when the first and second trim valves both supply the clutch engagement pressure to the first and second fluid passageways respectively and also when the first and second trim valves both exhaust the first and second fluid passageways respectively, and is otherwise in a second operating state different from the first operating state.

The system may further comprise a control circuit including a memory having instructions stored therein that are executable by the control circuit to monitor the operating state of the first pressure switch, to determine an expected operating state of the first pressure switch based on current operating conditions of the transmission, and to generate a fault signal if the monitored operating state of the first pressure switch is different from the expected operating state of the first pressure switch. The instructions stored in the memory may further include instructions executable by the control circuit to store a trim system fault code in the memory if the monitored operating state of the first pressure switch is different from the expected operating state of the first pressure switch. Alternatively or additionally, the instructions stored in the memory further may include instructions executable by the control circuit to determine an expected operating state of the first pressure switch based on current operating conditions of the transmission by determining that the first pressure switch should be in the first operating state when the transmission is in true neutral, in-range neutral or transitioning between adjacent ones of a number of different operating modes of the transmission.

The at least one clutch control valve may comprise a first control valve fluidly coupled to the first trim valve via the first fluid passageway and also to first and second friction engagement devices, and a second control valve fluidly coupled to the first and second trim valves via the first and second fluid passageways and also to a third friction engagement device. The system may further comprise a second pressure switch fluidly coupled to the first control valve such that the second pressure switch is in a first operating state when the first control valve is de-stroked and is in a second operating state when the first control valve is stroked. The system may further comprise a control circuit including a memory having instructions stored therein that are executable by the control circuit to monitor the operating state of the second pressure switch, determine an expected operating state of the second pressure switch based on current operating conditions of the transmission, and generate a first control valve fault signal if the monitored operating state of the second pressure switch is different from the expected operating state of the second pressure switch. The system may further comprise a third pressure switch fluidly coupled to the second control valve such that the third pressure switch is in a first operating state when the second control valve is de-stroked and is in a second operating state when the second control valve is stroked. The instructions stored in the memory may further include instructions that are executable by the control circuit to monitor the operating state of the third pressure switch, determine an expected operating state of the third pressure switch based on current operating conditions of the transmission, and generate a second control valve fault signal if the monitored operating state of the third pressure switch is different from the expected operating state of the third pressure switch.

A system for detecting clutch-related faults in an automatic transmission may comprise a trim system configured to selectively supply clutch engagement pressure and exhaust to first and second fluid passageways, a first control valve fluidly coupled to the trim system via the first fluid passageway and also to first and second friction engagement devices, a second control valve fluidly coupled to the trim system via the first and second fluid passageways and also to a third friction engagement device, a first pressure switch fluidly coupled to the first control valve such that the first pressure switch is in a first operating state when the first control valve is de-stroked and is in a second operating state when the first control valve is stroked, and a control circuit including a memory having instructions stored therein that are executable by the control circuit to monitor the operating state of the first pressure switch, determine an expected operating state of the first pressure switch based on current operating conditions of the transmission, and generate a first control valve fault signal if the monitored operating state of the first pressure switch is different from the expected operating state of the first pressure switch.

The system may further comprise a second pressure switch fluidly coupled to the second control valve such that the second pressure switch is in a first operating state when the second control valve is de-stroked and is in a second operating state when the second control valve is stroked. The instructions stored in the memory may further include instructions that are executable by the control circuit to monitor the operating state of the second pressure switch, determine an expected operating state of the second pressure switch based on current operating conditions of the transmission, and generate a second control valve fault signal if the monitored operating state of the second pressure switch is different from the expected operating state of the second pressure switch.

BRIEF DESCRIPTION OF THE DRAWINGS

FIG. 8 is a magnified view of the clutch trim valves illustrated in FIG. 3 showing one operating state thereof.

FIG. 9 is another magnified view of the clutch trim valves illustrated in FIG. 3 showing another operating state thereof.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
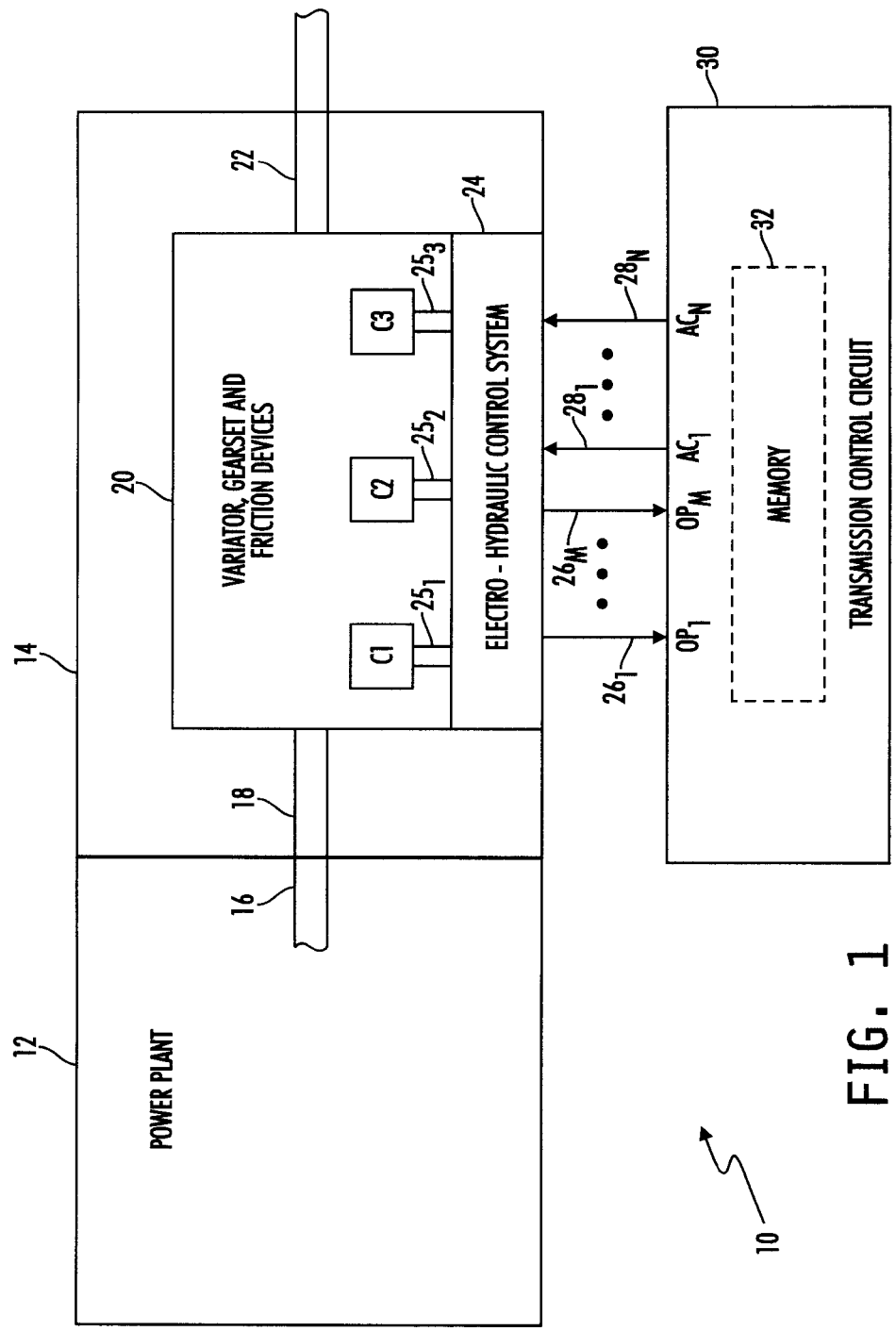
FIG. 1 is a block diagram of one illustrative embodiment of a system for controlling operation of a toroidal traction drive automatic transmission.

Referring now to FIG. 1, a block diagram is shown of one illustrative embodiment of a system 10 for controlling operation of a toroidal traction drive automatic transmission 14. In the illustrated embodiment, a power plant or energy center 12 is coupled to an automatic transmission 14 such that a rotatable output shaft 16 of the power plant 12 is coupled to a rotatable input shaft 18 of the transmission 14 in a conventional manner. The input shaft 18 is coupled, in the illustrated embodiment, to a combination variator and gear set 20 that further includes a plurality of selectively engageable friction devices, e.g., one or more conventional, selectively engageable clutches or the like, and an output of the combination variator and gear set 20 is coupled to a rotatable output shaft 22. The combination variator and gear set 20 is illustratively controlled by an electro-hydraulic control system 24, some of the details of which will be described in greater detail hereinafter.

The power plant 12 is generally an apparatus that produces rotational drive power at the output shaft 16. Examples of the power plant 12 include, but should not be limited to, one or any combination of a one or more engines, such as an internal combustion engine of the spark ignited, compression ignition or other variety, a steam engine, or type of engine that produces mechanical energy from one or more other fuel sources, one or more electrical generators, and the like.

Figure 2A:
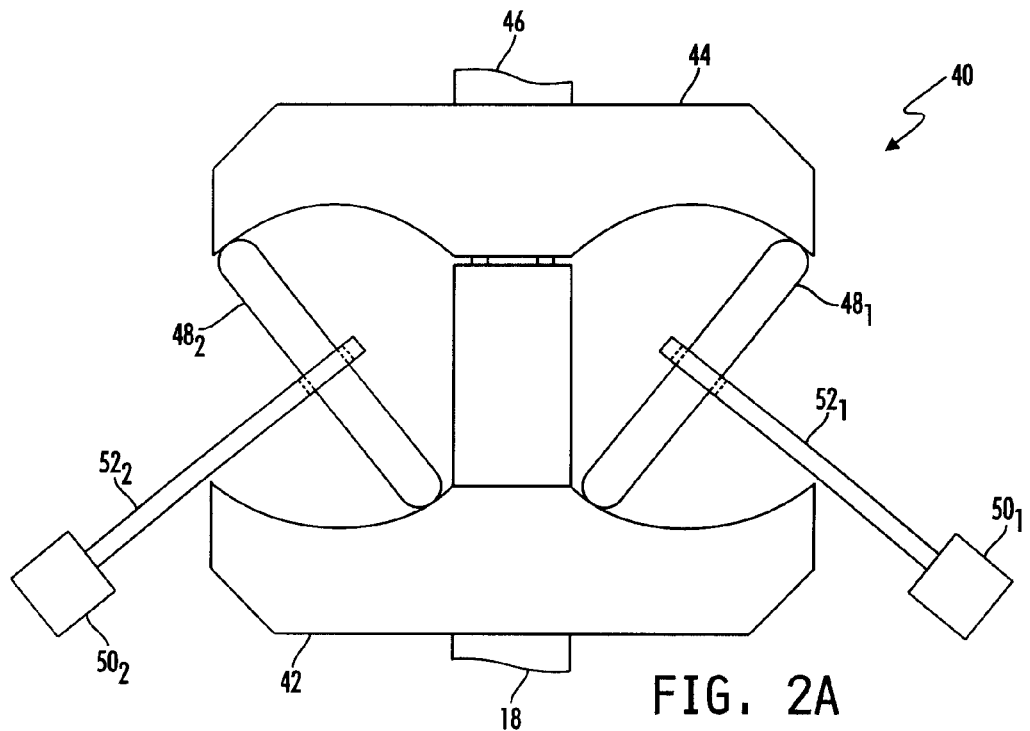
FIG. 2A is a diagram illustrating operation of one illustrative embodiment of a variator that forms part of the toroidal traction drive automatic transmission illustrated in FIG. 1.
Figure 2B:
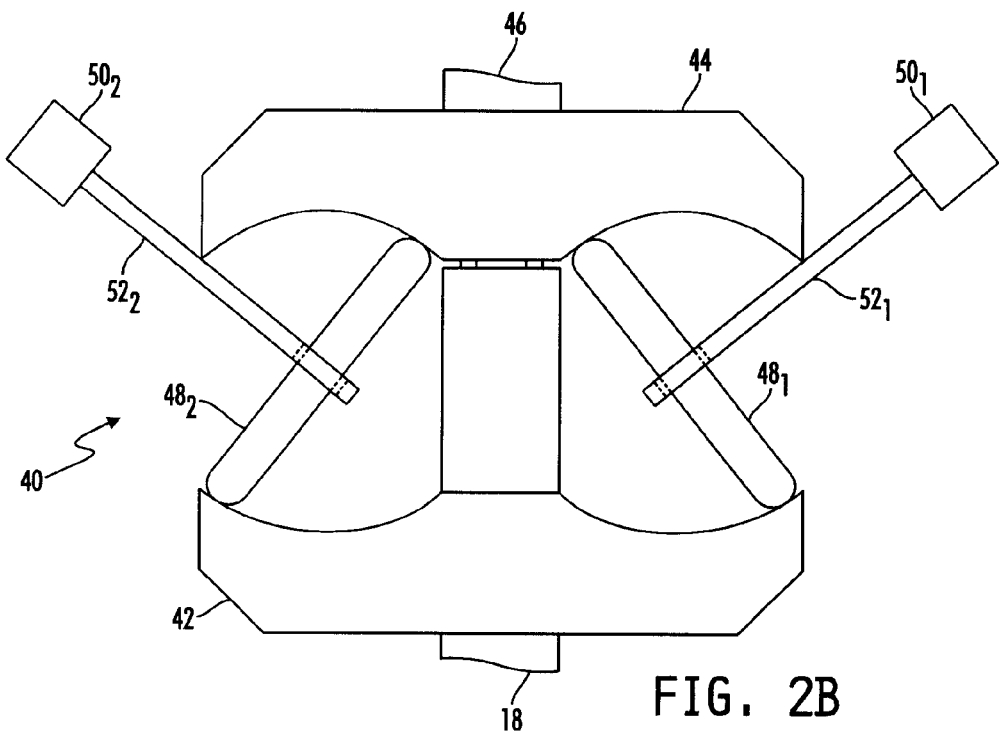
FIG. 2B is a diagram further illustrating operation of the variator of FIG. 2A.

The combination variator and gear set 20 illustratively includes a conventional full-toroidal, traction-drive variator that is coupled to a conventional gear set. Referring to FIGS. 2A and 2B, one illustrative embodiment of some of the structural features of such a full-toroidal, traction-drive variator 40 is shown. In the illustrated embodiment, the variator 40 includes a pair of opposing, toroidal-shaped disks 42 and 44 that rotate independently of each other. For example, the disk 42 is rigidly coupled to the input shaft 18 of the transmission 14 such that the disk 42 is rotatably driven by the power plant 12. The disk 44 is rigidly coupled to an output shaft 46 of the variator 40, and is rotatably coupled to the shaft 18 such that the disk 44 rotates freely about the shaft 18. The output shaft 46 of the variator 40 is coupled directly, or indirectly through one or more transmission gears, to the output shaft 22 of the transmission 14 such that output shaft 46 of the variator 40 drives one or more wheels of a vehicle (not shown) carrying the power plant 12 and transmission 14.

A number of rollers 48 are illustratively positioned between opposing inner, arcuate-shaped surfaces of the disks 42 and 44, and a traction fluid (not shown) is disposed between the rolling surface of each such roller 48 and the inner surfaces of the disks 42 and 44. In the illustrated embodiment, the rolling surfaces of the various rollers 48 therefore do not contact, in a structural sense, the inner surface of either disk 42, 44; rather torque is transmitted by the various rollers 48 between the two disks 42, 44 via the traction fluid. It is because torque is transferred between the two disks 42, 44 via the traction fluid and not via structural contact between the rolling surfaces of the rollers 48 and the arcuate inner surfaces of the disks 42, 44 that the variator is referred to as a traction-drive apparatus.

In the embodiment illustrated in FIGS. 2A and 2B, two such rollers $48_1$ and $48_2$ are shown operatively positioned between the opposing inner surfaces of the two disks 42, 44. A roller actuator $50_1$, e.g., in the form of a conventional hydraulically actuated piston, is coupled to the roller $48_1$ via a bracket $52_1$, and another roller actuator $50_2$, e.g., in the form of another conventional hydraulically actuated piston, is coupled to the roller $48_2$ via a bracket $52_2$. It will be understood that the brackets $52_1$ and $52_2$ do not represent rotatable shafts about which the rollers $48_1$ and $48_2$ may be rotatably driven. Rather, the brackets $52_1$ and $52_2$ represent structures about which the rollers $48_1$ and $48_2$ rotate. In one actual implementation, for example, the brackets $52_1$ and $52_2$ are configured to attach to the central hub of the rollers $48_1$ and $48_2$ on either side thereof such that the brackets $52_1$ and $52_2$ and actuators $50_1$ and $50_2$ would extend generally perpendicular to the page illustrating FIGS. 2A and 2B.

The hydraulically controlled actuators $50_1$ and $50_2$ are each illustratively controllable, by selectively controlling a high-side hydraulic pressure applied to one side of the actuator and a low-side hydraulic pressure applied to the opposite side of the actuator, to thereby control torque transferred from a corresponding roller $48_1$, $48_2$ relative to the inner, annular surfaces of the two disks 42, 44. The actuators $50_1$ and $50_2$ illustratively control driveline torque rather than the position or pitch of the rollers $48_1$ and $48_2$. The rollers $48_1$ and $48_2$ are free-castoring, and are responsive to the actuators $50_1$ and $50_2$ to seek a position that provides the correct ratio match of engine and drive train speeds based on input energy equaling output energy.

In one illustrative implementation, the variator 40 includes two sets or pairs of disks 42 and 44, with the pairs of the disks 42 rigidly coupled to each other and with the pairs of the disks 44 also rigidly coupled to each other, such that the embodiment illustrated in FIGS. 2A and 2B represents one-half of such an implementation. In this illustrative implementation, three rollers are positioned between each opposing set of disks 42, 44 for a total of six rollers $48_1$-$48_6$ and six corresponding hydraulically controlled actuators $50_1$-$50_6$. It will be understood, however, that this particular implementation of the variator 40 is shown and described only by way of example, and that other embodiments of the variator 40 that include more or fewer pairs of disks 42, 44, that include more or fewer rollers 48 and hydraulically controlled actuators 50, and/or that are configured to be only partially toroidal in shape, may alternatively be used. It will further be understood that while the operation of the variator 40 illustrated and described herein as being generally hydraulically controlled, this disclosure contemplates embodiments in which operation of the variator 40 is controlled via purely electronic or electro-mechanical structures.

Referring again to FIG. 1, the gear set within the combination variator and gear set 20 illustratively includes one or more conventional planetary gear set(s) and/or other gear set(s) that define(s) at least two automatically selectable gear ratios and that is coupled to, or integrated with, the variator, e.g., the variator 40 illustrated and described with respect to FIG. 2. The combination variator and gear set 20 further illustratively includes a number of conventional friction devices, e.g., clutches, which may be selectively controlled to thereby control shifting of the transmission 14 between the two or more gear ratios. In alternate embodiments, the gear set may include more than one planetary gear set, one or more planetary gear sets in combination with one or more other conventional gear sets, or exclusively one or more non-planetary gear sets.

In the example embodiment illustrated in FIG. 1, the transmission 14 includes three friction devices, e.g., in the form of three conventional clutches C1, C2 and C3. In this embodiment, each clutch C1, C2 and C3 is operated in a conventional manner, e.g., via fluid pressure, under the control of the electro-hydraulic control system 24. In this regard, a fluid path $25_1$ is fluidly coupled between the electro-hydraulic control system 24 and the clutch C1, a fluid path $25_2$ is fluidly coupled between the electro-hydraulic control system 24 and the clutch C2, and a fluid path $25_3$ is fluidly coupled between the electro-hydraulic control system 24 and the clutch C3. The gear set and the clutches C1, C2 and C3 are illustratively arranged to provide four separate modes of operation of the transmission 14, and the various operating modes of the transmission 14 are selectively controlled by the operation of the clutches C1, C2 and C3.

In a first operating mode, M1, for example, the clutch C1 is applied, e.g., engaged, while the clutches C2 and C3 are released, e.g., disengaged, and in this mode forward or reverse launch can be accomplished, and the vehicle carrying the transmission 14 can be operated at vehicle speeds up to about 10 miles per hour. In a second operating mode, M2, as another example, the clutch C2 is engaged while the clutches C1 and C3 are disengaged, and in this mode the vehicle can be operated at vehicle speeds in the range of about 10-30 miles per hour. In a third operating mode, M3, as yet another example, the clutch C3 is engaged while the clutches C1 and C2 are disengaged, and in this mode the vehicle can be operated at vehicle speeds greater than about 30 miles per hour. In a fourth mode, M0, as a final example, the clutches C1, C2 and C3 are all disengaged, and in this mode the transmission 14 is in neutral. In one embodiment of the electro-hydraulic control system 24 illustrated in FIG. 1, as will be described in greater detail hereinafter, two neutral conditions are possible; namely an in-range neutral and a so-called "true neutral." In the transitional states between the various operating modes M1, M2 and M3, the variator torque is illustratively reversed to assist transitions from one operating mode to the next.

The system 10 further includes a transmission control circuit 30 that controls and manages the overall operation of the transmission 14. The transmission control circuit 30 includes a number, M, of operating parameter inputs, $OP_1$-$OP_M$, that are electrically connected to corresponding operating parameter sensors included within the electro-hydraulic control system 24 via corresponding signal paths $26_1$-$26_M$, wherein M may be any positive integer. The one or more operating parameter sensors included within the electro-hydraulic control system 24, examples of which will be described hereinafter, produce corresponding operating parameter signals on the signal paths $26_1$-$26_M$, which are received by the transmission control circuit 30. The transmission 14 further includes a number, N, of electrically controllable actuators included within the electro-hydraulic control system 24 that are each electrically connected to different one of a corresponding number of actuator control outputs, $AC_1$-$AC_N$ of the transmission control circuit 30 via corresponding signal paths $28_1$-$28_N$, wherein N may be any positive integer. The one or more electrically controllable actuators included within the electro-hydraulic control system 24, examples of which will be described hereinafter, are responsive to actuator control signals produced by the transmission control circuit 30 on the corresponding signal paths $28_1$-$28_N$ to control various operational features of the transmission 14.

Illustratively, the transmission control circuit 30 is microprocessor-based, and includes a memory unit 32 having instructions stored therein that are executable by the control circuit 30 to control operation of the transmission 14 generally, and more specifically to control operation of the electro-hydraulic control system 24 as will be described herein. It will be understood, however, that this disclosure contemplates other embodiments in which the transmission control circuit 30 is not microprocessor-based, but is configured to control operation of the transmission 14 generally and operation of the electro-hydraulic system 24 more specifically, based on one or more sets of hardwired instructions and/or software instructions stored in the memory unit 32.

Figure 3:
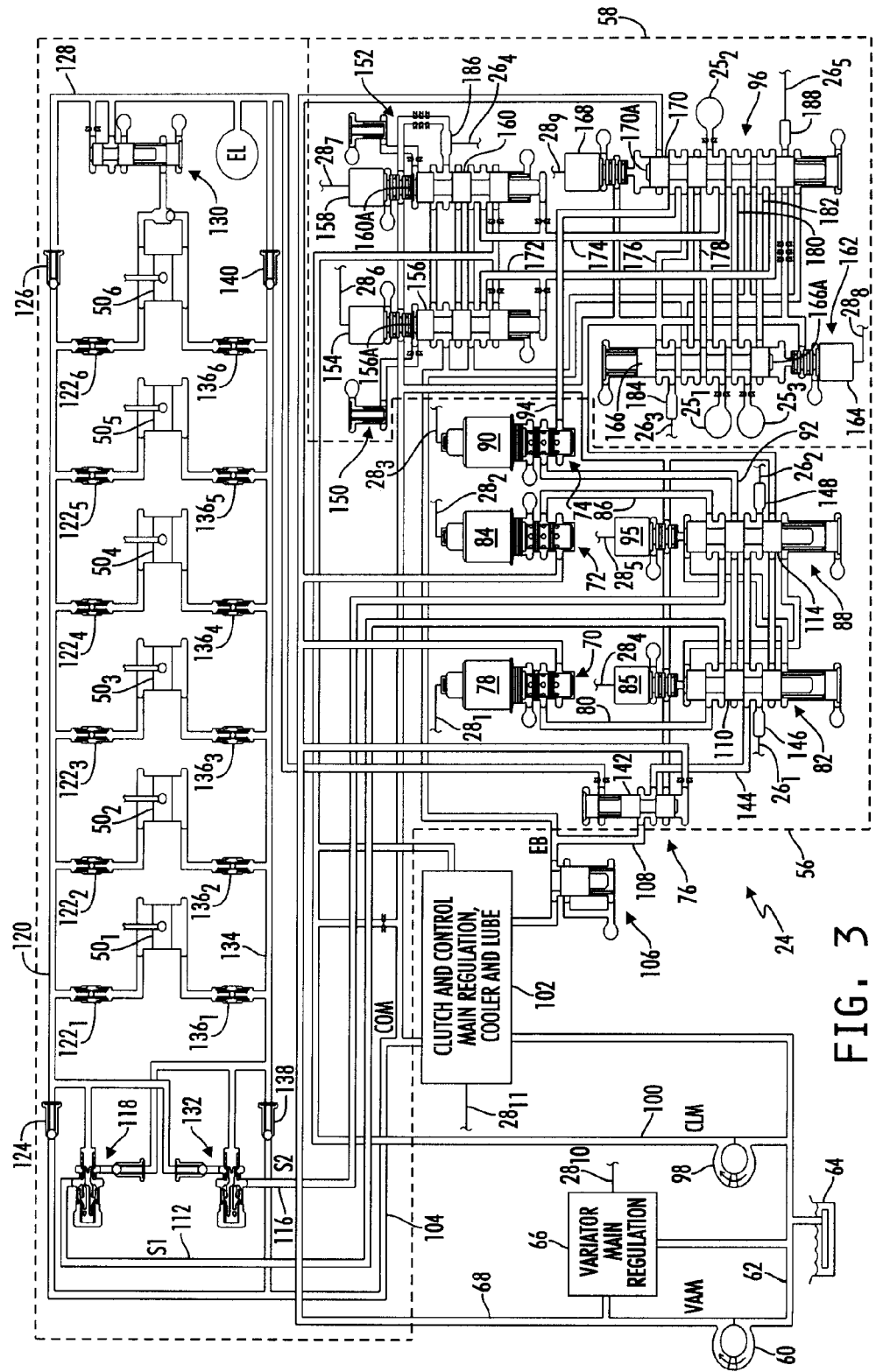
FIG. 3 is a schematic diagram of one illustrative embodiment of the electro-hydraulic control system that forms part of the toroidal traction drive automatic transmission illustrated in FIG. 1.

Referring now to FIG. 3, a schematic diagram is shown of one illustrative embodiment of the electro-hydraulic control system 24 of FIG. 1. In the illustrated embodiment, the electro-hydraulic control system 24 is roughly divided in two separate control sections; a variator control section 56 and a clutch control section 58. A conventional fluid pump 60 is configured to supply transmission fluid, e.g., conventional transmission oil, to the variator control section 56 from a source 64 of transmission fluid, e.g., a conventional transmission sump. In the illustrated embodiment, a fluid inlet of the fluid pump 60 fluidly coupled to the sump 64 via a fluid passageway 62. A fluid outlet of the pump 60 is fluidly coupled to an inlet of a variator main regulation block 66 via a variator main fluid passageway 68 (VAM), and one of the output signal paths $28_{10}$ of the control circuit 30 is electrically connected to the variator main regulation block 66. The variator main regulation block 66 includes conventional components, e.g., one or more valves, responsive to a control signal produced on the signal path $28_{10}$ by the transmission control circuit 30 to supply pressure-regulated transmission fluid to the fluid passageway 68 in a conventional manner.

The variator main fluid passageway 68 is fluidly coupled to fluid inlets of two variator trim valves 70 and 72, to one end of a variator fault valve 76 and also to a clutch control valve 96 located in the clutch control section 58 of the electro-hydraulic control system 24. The variator trim valves 70 and 72 each include an actuator 78 and 84 respectively that is electrically connected to the transmission control circuit 30 via a signal path $28_1$ and $28_2$ respectively. Another fluid inlet of each variator trim valve 70 and 72 is fluidly coupled to exhaust. A fluid outlet of the variator trim valve 70 is fluidly coupled to a variator control valve 82 via a fluid passageway 80, and a fluid outlet of the variator trim valve 72 is fluidly coupled to another variator control valve 88 via a fluid passageway 86. In the illustrated embodiment, the actuators 78 and 84 are illustratively conventional electronically actuated solenoids, and the trim valves 70 and 72 are illustratively variable-bleed valves that supply variable-pressure transmission fluid to the fluid passageways 80 and 86 respectively based on control signals produced by the transmission control circuit 30 on the signal paths $28_1$ and $28_2$ respectively.

The variator control section 56 of the electro-hydraulic control system 24 further includes another variator trim valve 74 including an actuator 90 that is electrically connected to the transmission control circuit 30 via a signal path $28_3$. One fluid inlet of the trim valve 74 is fluidly coupled to the clutch control valve 96 via a fluid path 94, and another fluid inlet of the variator trim valve 74 is fluidly coupled to exhaust. A fluid outlet of the variator trim valve 74 is fluidly coupled to the variator control valves 82 and 88 via a fluid passageway 92. The actuator 90 illustratively a conventional electronically actuated solenoid, and the trim valve 74 is illustratively a variable-bleed valve that supplies variable-pressure transmission fluid to the fluid passageway 92 based on control signals produced by the transmission control circuit 30 on the signal path $28_3$.

Another conventional fluid pump 98 is configured to supply transmission fluid from the sump 64 to the clutch control section 58 of the electro-hydraulic control system 24. In the illustrated embodiment, a fluid inlet of the fluid pump 98 is fluidly coupled to the sump 64 via the fluid passageway 62, and fluid outlet of the pump 98 is fluidly coupled to a fluid inlet of a clutch and control main regulation, cooler and lube block 102 via a fluid passageway 100. Another one of the output signal paths $28_{11}$ of the control circuit 30 is electrically connected to the clutch and control main regulation, cooler and lube block 102. The clutch and control main regulation, cooler and lube block 102 illustratively includes conventional components, e.g., one or more valves, responsive to a control signal produced on the signal path $28_{11}$ by the transmission control circuit 30 to supply pressure-regulated transmission fluid to the clutch main, CLM, fluid passageway 100 and to a control main, COM, fluid passageway 104 in a conventional manner. The control main, COM, fluid passageway 104 is further fluidly coupled to the variator control valves 82 and 88.

An exhaust backfill valve 106 establishes an exhaust backfill pressure, EB, in an exhaust backfill fluid passageway 108 that is also fluidly coupled to the clutch and control main regulation, cooler and lube block 102 and also to the variator fault valve 76. The clutch and control main regulation, cooler and lube block 102 further includes conventional components for cooling and filtering the transmission fluid and for providing lubrication paths to the variator and to the various gears of the gear set of the transmission 14.

The variator control valves 82 and 88 each include an actuator 85 and 95 respectively that is electrically connected to the transmission control circuit 30 via a signal path $28_4$ and $28_5$ respectively. In the illustrated embodiment, the actuators 85 and 95 are illustratively conventional electronically actuated solenoids. The variator control valve 82 further includes a spool 110, and the actuator 85 is responsive to control signals produced by the transmission control circuit 30 on the signal path $28_4$ to selectively control the position of the spool 110 to thereby selectively control fluid pressure in a fluid passageway 112. The variator control valve 88 likewise includes a spool 114, and the actuator 95 is responsive to control signals produced by the transmission control circuit 30 on the signal path $28_5$ to selectively control the position of the spool 114 to thereby selectively control fluid pressure in a fluid passageway 116. For purposes of this document, the fluid paths 112 and 116 may be referred to herein as S1 and S2 respectively.

The S1 fluid path (112) is fluidly coupled to one end of a conventional damper 118, an opposite end of which is fluidly coupled to a variator high-side fluid passageway 120. In the embodiment illustrated in FIG. 3, the variator includes six actuators, $50_1$-$50_6$, e.g., conventional pistons, and the variator high-side fluid passageway 120 is fluidly coupled to one side, e.g., a high side, of each such actuator $50_1$-$50_6$ via a corresponding conventional damper $122_1$-$122_6$. A conventional check valve 124 is interposed between the variator high-side fluid passageway 120 and the control main (COM) fluid path 104, and another conventional check valve 126 is interposed between the variator high-side fluid passageway 120 and an endload fluid passageway 128.

The S2 fluid path (116) is similarly fluidly coupled to one end of another conventional damper 132, an opposite end of which is fluidly coupled to a variator low-side fluid passageway 134. The variator low-side fluid passageway 134 is fluidly coupled to an opposite side, e.g., a low side, of each actuator $50_1$-$50_6$ of the variator via a corresponding conventional damper $136_1$-$136_6$. A conventional check valve 138 is interposed between the variator low-side fluid passageway 134 and the control main (COM) fluid path 104, and another conventional check valve 140 is interposed between the variator low-side fluid passageway 134 and the endload fluid passageway 128. The endload fluid passageway 128 is fluidly coupled to an endload relief valve 130, which is further fluidly coupled between the high side and the low side of the actuator $50_6$. Further details relating to one illustrative structure and method of operating the endload relief valve 130 are provided in co-pending U.S. Patent Application Ser. No. 61/287,020, the disclosure of which is incorporated herein by reference in its entirety.

The endload fluid passageway 128 is further fluidly coupled to an opposite end of the variator fault valve 76. The variator fault valve 76 illustratively includes a spool 142, and is fluidly coupled to the variator control valves 82 and 88 via a fluid passageway 144. The spool 142 of the variator fault valve 76 is responsive to a difference in pressure between the variator main fluid passageway 68 at one end and the endload fluid passageway 128 at its opposite end to supply a selectable fluid pressure to the fluid passageway 144. In the embodiment illustrated in FIG. 3, for example, if the fluid pressure in the variator main fluid passageway 68 is sufficiently greater than that in the endload fluid passageway 128, the spool 144 is forced upwardly and thereby fluidly couples the exhaust backfill fluid passageway (EB) 108 to the fluid passageway 144. This is the position of the spool 142 illustrated in FIG. 3. If instead the fluid pressure in the endload fluid passageway 128 is sufficiently greater than that in the variator main fluid passageway 68, the spool 144 is forced downwardly and thereby fluidly couples the control main (COM) fluid passageway 104 to the fluid passageway 144. Illustratively, the variator fault valve 76 is designed to have a specified amount of hysteresis between the two extreme positions of the spool 142, and in one embodiment the hysteresis is approximately 15-20% such that the differential pressure between VAM 68 and the endload fluid passageway 128 must be greater than about 15-20% before the spool 142 changes position. Those skilled in the art will appreciate that this hysteresis value is provided only by way of example and that other hysteresis values, or no hysteresis value, may alternatively be used.

In the illustrated embodiment, sensors are operatively positioned relative to each of the variator control valves 82 and 88 to enable monitoring of the operating states of each of these valves. In one illustrative embodiment, the sensors are provided in the form of conventional pressure switches, although it will be understood that a conventional pressure sensor may be substituted for any one or more of the pressure switches. In any case, each of the pressure switches is electrically connected to the transmission control circuit 30 to allow monitoring by the transmission control circuit 30 of the states of the pressure switches and thus the operating states of the valves 82 and 88. In the embodiment illustrated in FIG. 3, for example, a pressure switch 146 is fluidly coupled to the variator control valve 82, and is electrically connected to the transmission control circuit 30 via one of the signal paths $26_1$. Another pressure switch 148 is fluidly coupled to the variator control valve 88, and is electrically connected to the transmission control circuit 30 via another one of the signal paths $26_2$. The transmission control circuit 30 is operable to process the signals produced by the pressure switch 146 and 148 in a known manner to determine corresponding operating states, i.e., whether activated or deactivated, of the valves 82 and 88. Further details relating to the structure and operation of the variator control section 56 generally, and to the operation of and fault conditions associated with the valves 70, 72, 74, 82 and 88 in particular, are provided in co-pending U.S. Patent Application Ser. No. 61/286,974, in co-pending U.S. Patent Application Ser. No. 61/286,984, and in co-pending U.S. Patent Application Ser. No. 61/287,003, the disclosures of which are all incorporated herein by reference in their entirety.

In the embodiment illustrated in FIG. 3, the clutch main pressure (CLM) is illustratively supplied via the fluid passageway 100 to the clutch control section 58 of the electrohydraulic control system 24. In particular, the clutch main fluid pressure, CLM, is fluidly applied via the clutch main fluid passageway 100 to each of a pair of clutch trim valves 150 and 152. Together the clutch trim valves 150 and 152 may be referred to herein as a trim system. The clutch trim valves 150 and 152 each illustratively include an actuator 154 and 158 respectively that is electrically connected to the transmission control circuit 30 via a signal path $28_6$ and $28_7$ respectively. One control fluid inlet of each of the clutch trim valves 150 and 152 is fluidly coupled to the control main fluid passageway 104, and another control fluid inlet of each clutch trim valve 150 and 152 is fluidly coupled to exhaust. Each trim valve 150 and 152 further includes a movable spool 156 and 160 respectively that is movable between two spool positions based on fluid pressure applied to control ends 156A and 160A respectively thereof. In the illustrated embodiment, the actuators 154 and 158 are illustratively conventional electronically actuated solenoids. The trim valves 150 and 152 are each configured to selectively supply control main (COM) pressure or exhaust to the control ends 156A and 160A of the spools 156 and 160 respectively based on control signals produced by the transmission control circuit 30 on the signal paths $28_6$ and $28_7$ respectively to thereby move the spools 156 and 160 respectively between their two spool positions. The clutch trim valves 150 and 152 are further fluidly coupled to each other via a number of fluid passageways, and the exhaust backfill, EB, fluid passageway 108 is fluidly coupled directly to the trim valve 150 and 152.

Fluid outlets of each of the clutch trim valves 150 and 152 are fluidly coupled to fluid inlets of each of a pair of clutch control valves 162 and 96 via fluid passageways 172 and 174 respectively. The clutch trim valves 150 and 152 are each configured to selectively, i.e., under the control of the transmission control circuit 30 via signals produced by the transmission control circuit 30 on the signal paths $28_6$ and $28_7$ respectively, supply a clutch engagement pressure, e.g., the clutch main pressure, CLM, and a clutch disengagement pressure, e.g., exhaust backfill, EB, independently to the fluid passageways 172 and 174.

The clutch control valves 162 and 96 each illustratively include an electronic actuator, e.g., an electrically controlled solenoid, 164 and 168 respectively that is electrically connected to the transmission control circuit 30 via a signal path $28_8$ and $28_9$ respectively. One control fluid inlet of each clutch control valve 162 and 96 is fluidly coupled to the control main, COM, fluid passageway 104, and another control fluid inlet is fluidly coupled to exhaust. Each valve 162 and 96 is responsive to a control signal produced by the transmission control circuit 30 on the signal path $28_8$ and $28_9$ respectively to selectively apply the control main pressure, COM, or exhaust to a control end 166A and 170A respectively of a spool 166 and 170 respectively carried by each valve 162 and 96 to thereby move the spools 166 and 170 between two spool positions. The clutch control valves 162 and 96 are further fluidly coupled to each other via fluid passageways 176, 178, 180 and 182. The control main pressure, COM, fluid passageway 104 is also fluidly coupled directly to the other portions of each clutch control valve 162 and 96, and the exhaust backfill, EB, fluid passageway 108 is fluidly coupled directly to each of the clutch control valves 162 and 96.

The clutch control valve 96 is further fluidly coupled directly to the C2 clutch fluid path $25_2$, and clutch main fluid, CLM, or exhaust backfill, EB, is selectively applied to the C2 clutch via the fluid path $25_2$ via various combinations of states of the actuators 154, 158, 164 and 168. The clutch control valve 162 is further fluidly coupled directly to each of the C1 and C3 clutch fluid paths $25_1$ and $25_3$, and clutch main fluid, CLM, or exhaust backfill, EB, is selectively routed through the clutch control valve 162 to the C1 clutch via the fluid passageway $25_1$ or to the C3 clutch via the fluid passageway $25_3$ via various combinations of states of the actuators 154, 158, 164 and 168. The clutches C1-C3 are thus selectively activated, i.e., engaged, and deactivated, i.e., disengaged, based on the operating states of the actuators 154, 158, 164 and 168 of the clutch trim valves 150 and 152 and the clutch control valves 162 and 96 respectively, by selectively routing the CLM and EB pressures through the control valves 162 and 96 to the various clutches C1-C3. The clutch control valve 96 is directly fluidly coupled to the clutch C2 via the fluid passageway $25_2$, and control, i.e., engagement and disengagement, of the C2 clutch must therefore include appropriate control of the clutch control valve 96 to selectively route the CLM and EB pressures to the clutch C2. The clutch control valve 162, on the other hand, is directly fluidly coupled to the clutches C1 and C3 via the fluid passageways $25_1$ and $25_3$ respectively, and control, i.e., engagement and disengagement, of the clutches C1 and C3 must therefore include appropriate control of the clutch control valve 162 to selectively route the CLM and EB pressures to the clutches C1 and C3. Because the clutches C1 and C3 are never, during normal operation of the transmission 14, engaged simultaneously, control of the clutches C1 and C3 can therefore be multiplexed via the clutch control valve 162. Further details relating to the structure and operation of the clutch control valves 162 and 96 are provided in co-pending U.S. Patent Application Ser. No. 61/287,038, the disclosure of which is incorporated herein by reference in its entirety.

In the illustrated embodiment, sensors are operatively positioned relative to the clutch trim valve 152 and each of the clutch control valves 162 and 96 to enable monitoring of the operating states of each of the valves 150, 152, 162 and 96 and to further monitor certain transmission operating state faults. In one illustrative embodiment, such sensors are provided in the form of conventional pressure switches, although it will be understood that a conventional pressure sensor may be substituted for any one or more of the pressure switches. In any case, each of the pressure switches is electrically connected to the transmission control circuit 30 to allow monitoring by the transmission control circuit 30 of the states of the pressure switches and thus the operating states of the each of the valves 150, 152, 162 and 96 and of certain transmission operating state faults. In the embodiment illustrated in FIG. 3, for example, a pressure switch 184 is fluidly coupled to the clutch control valve 162, and is electrically connected to the transmission control circuit 30 via one of the signal paths $26_3$. Another pressure switch 186 is fluidly coupled to the clutch trim valve 152, and is electrically connected to the transmission control circuit 30 via another one of the signal paths $26_4$. Still another pressure switch 188 is fluidly coupled to the clutch control valve 96, and is electrically connected to the transmission control circuit 30 via another one of the signal paths $26_5$. The transmission control circuit 30 is operable to process the signals produced by the pressure switches 184, 186 and 188 to determine corresponding operating states, i.e., whether activated or deactivated, of the various valves 150, 152, 162 and 96 and of certain transmission operating state faults.

Figures 4, 5:
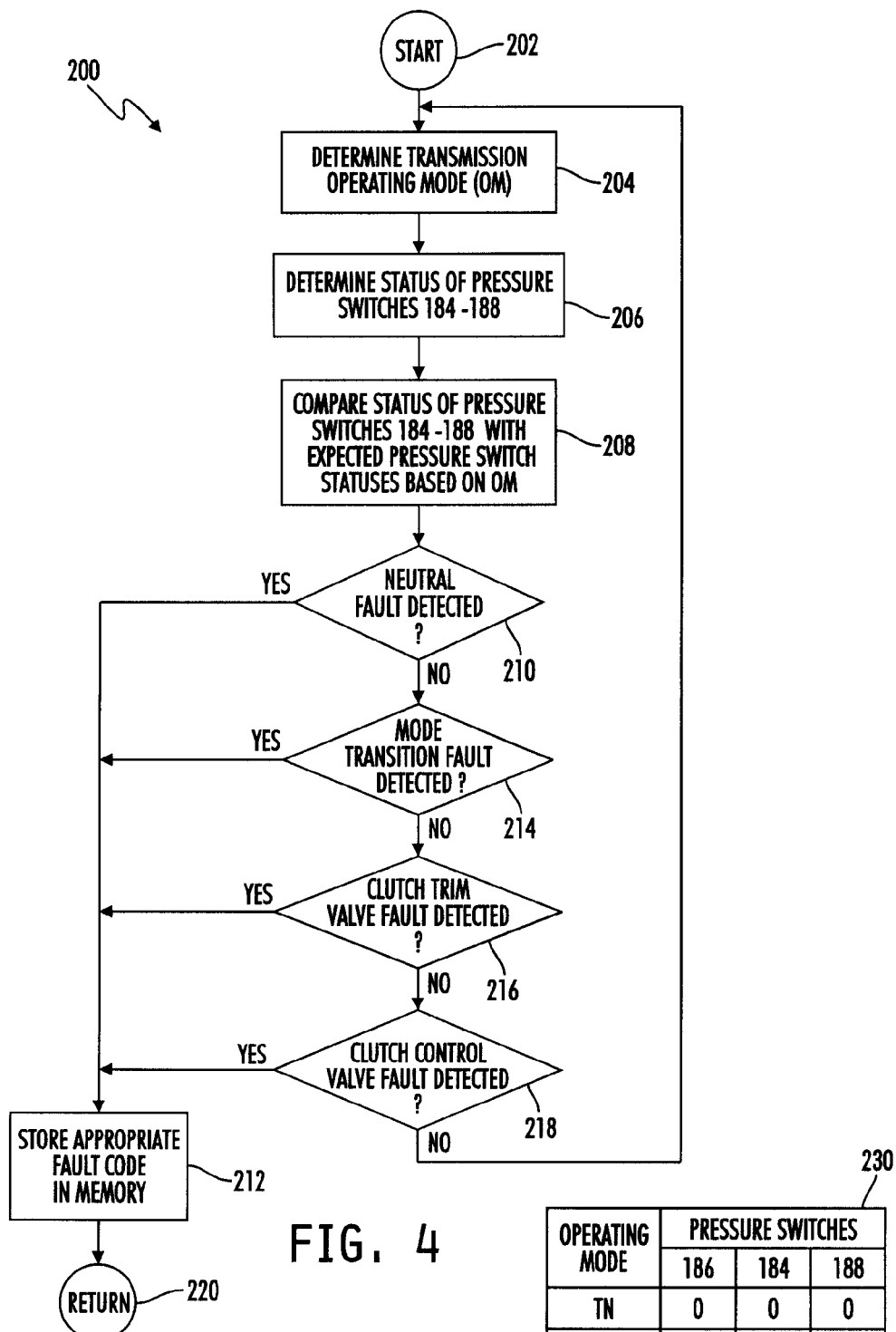
FIG. 4 is a flowchart of one illustrative embodiment of a process for diagnosing certain clutch-related fault states of the electro-hydraulic control system of FIG. 3.
FIG. 5 is a table of expected pressure states of the clutch trim system and clutch control valves during the various operating modes of the transmission.

Referring now to FIG. 4, a flowchart is shown of one illustrative embodiment of a process 200 for monitoring the statuses of the various pressure switches 184, 186 and 188 and diagnosing operation of the clutch control system 58, i.e., clutch-related faults or failures, based on the statuses of these switches. The term "true neutral" is defined for purposes of this document as an operating condition of the transmission 14 in which none of the clutches C1-C3 is activated or engaged, and in which all of the valves 150, 152, 162 and 96 of the clutch control system 58 are deactivated or de-stroked. In contrast, the term "in-range neutral" is defined for the purposes of this document as an operating condition of the transmission 14 in which none of the clutches C1-C3 is activated or engaged, and in which both of the clutch trim valves 150 and 152 are deactivated or de-stroked while one or both of the clutch control valves 162 and 96 is activated or stroked. The process 200 is illustratively stored in the memory 32 of the transmission control circuit 30 in the form of instructions that are executable by the transmission control circuit 30 to carry out the operations of the process 200 as will be described in detail hereinafter.

The process 200 begins at step 202, and thereafter at step 204 the transmission control circuit 30 is operable to determine the present operating mode, OM, of the transmission 14. Generally, as described hereinabove, the transmission 14 is operable in one of three non-neutral operating modes, M1-M3, in two neutral operating modes and in mode transition states in which the transmission 14 is transitioning between the various operating modes, and the operation of the transmission 14 at any given instant in time will depend primarily on the road speed of the vehicle carrying the transmission 14. Because the transmission control circuit 30 controls and manages the overall operation of the transmission 14, the transmission control circuit 30 will generally have knowledge at any given time of the current operating mode, OM, of the transmission 14. The transmission control circuit 30 thus executes step 204 by determining internally the current operating mode, OM, of the transmission 14. For purposes of this document, the term "operating mode" of the transmission is defined as any of the normal operating states of the transmission 14 including any of the three non-neutral operating modes, M1-M3, either of the two neutral operating modes, i.e., "true neutral" and "in-range neutral" and any of the mode transition states in which the transmission 14 is transitioning between adjacent ones of the various operating modes M1-M3. Following step 204, the transmission control circuit 30 is operable at step 206 to determine the status of each pressure switch 184, 186 and 188, e.g., by sampling and processing the pressure switch signals produced by the pressure switches on the corresponding signal paths $26_3$-$26_5$.

Figure 7:
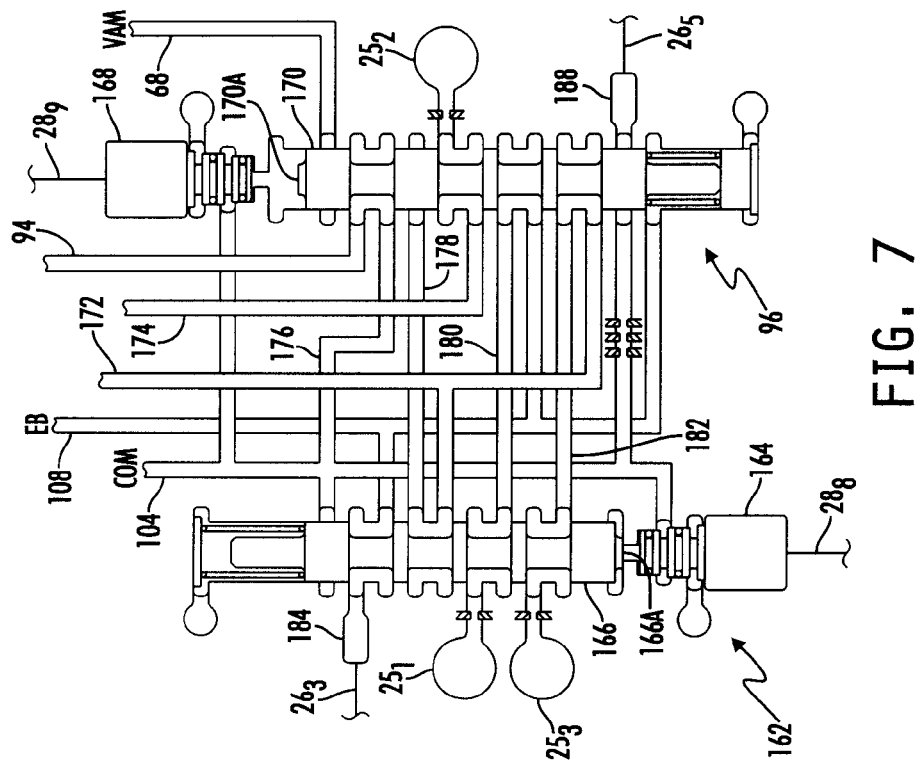
FIG. 7 is a magnified view of the clutch control valves illustrated in FIG. 3 showing another operating state thereof.
Figure 6:
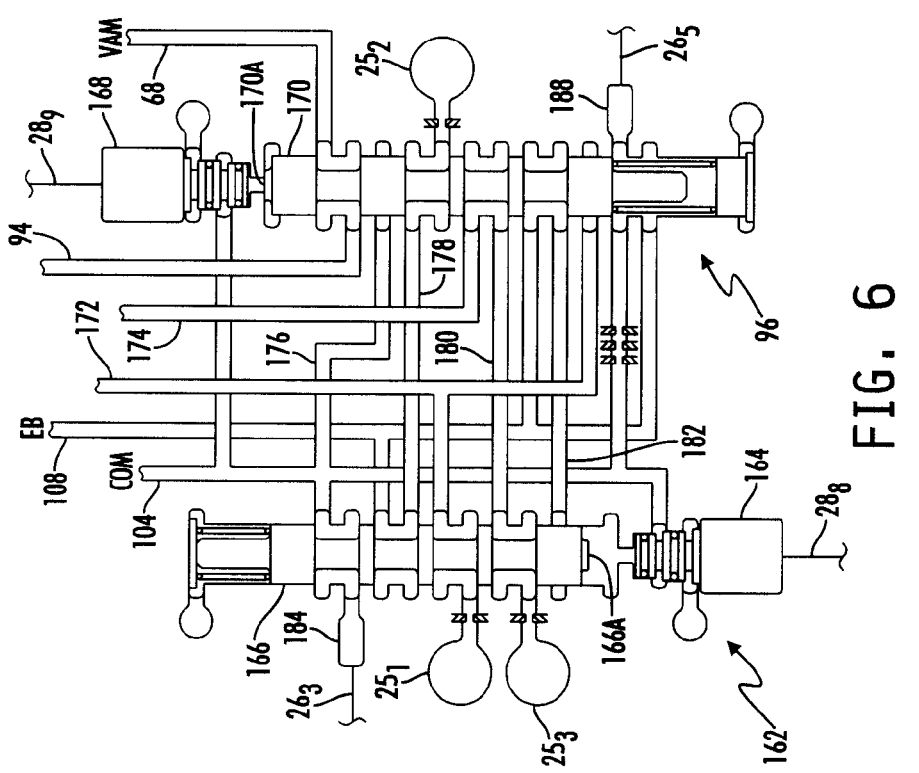
FIG. 6 is a magnified view of the clutch control valves illustrated in FIG. 3 showing one operating state thereof.

Referring to FIGS. 6 and 7, examples are shown of the possible operating states of each of the clutch control valves 162 and 96 and their impact on the statuses of their respective pressure switches 184 and 188. When the clutch control valve 162 is stroked, for example as illustrated in FIG. 6, the spool 166 routes the control main pressure, COM, to the pressure switch 184. The pressure switch 184 is responsive to the COM pressure to produce a high-valued output signal that the transmission control circuit 30 processes to determine the state or status of the pressure switch 184 as a high logic state, e.g., a "1." When the clutch control valve 162 is de-stroked, in contrast as illustrated in FIG. 7, the spool 166 routes the exhaust backfill, EB, to the pressure switch 184. The pressure switch 184 is responsive to the exhaust backfill, EB, to produce a low-valued output signal that the transmission control circuit 30 processes to determine the state or status of the pressure switch 184 as a low logic state, e.g., a "0." The pressure switch 188 associated with the clutch control valve 96 operates similarly, as illustrated in FIGS. 6 and 7, in that the pressure switch 188 produces a high-valued output signal in response to the control main pressure, COM, when the clutch control valve 96 is stroked (FIG. 7), and produces a low-valued output signal in response to the exhaust backfill, EB, when the control valve 96 is de-stroked (FIG. 6). The transmission control circuit 30 thus processes the state or status of the pressure switch 188 as a high logic state, or "1," when the clutch control valve 96 is stroked, and as a low logic state, or "0," when the clutch control valve 96 is de-stroked. It will be understood that the clutch control valve 162 and/or 96 could be alternatively configured such that the logic states of either or both of the pressure switches 184 and 188 are reversed, i.e., such that the state or status of the pressure switch 184 and/or 188 is a "0" when the respective valve 162 or 96 is stroked and is a "1" when the respective valve 162 or 96 is de-stroked.

Figures 10, 11:
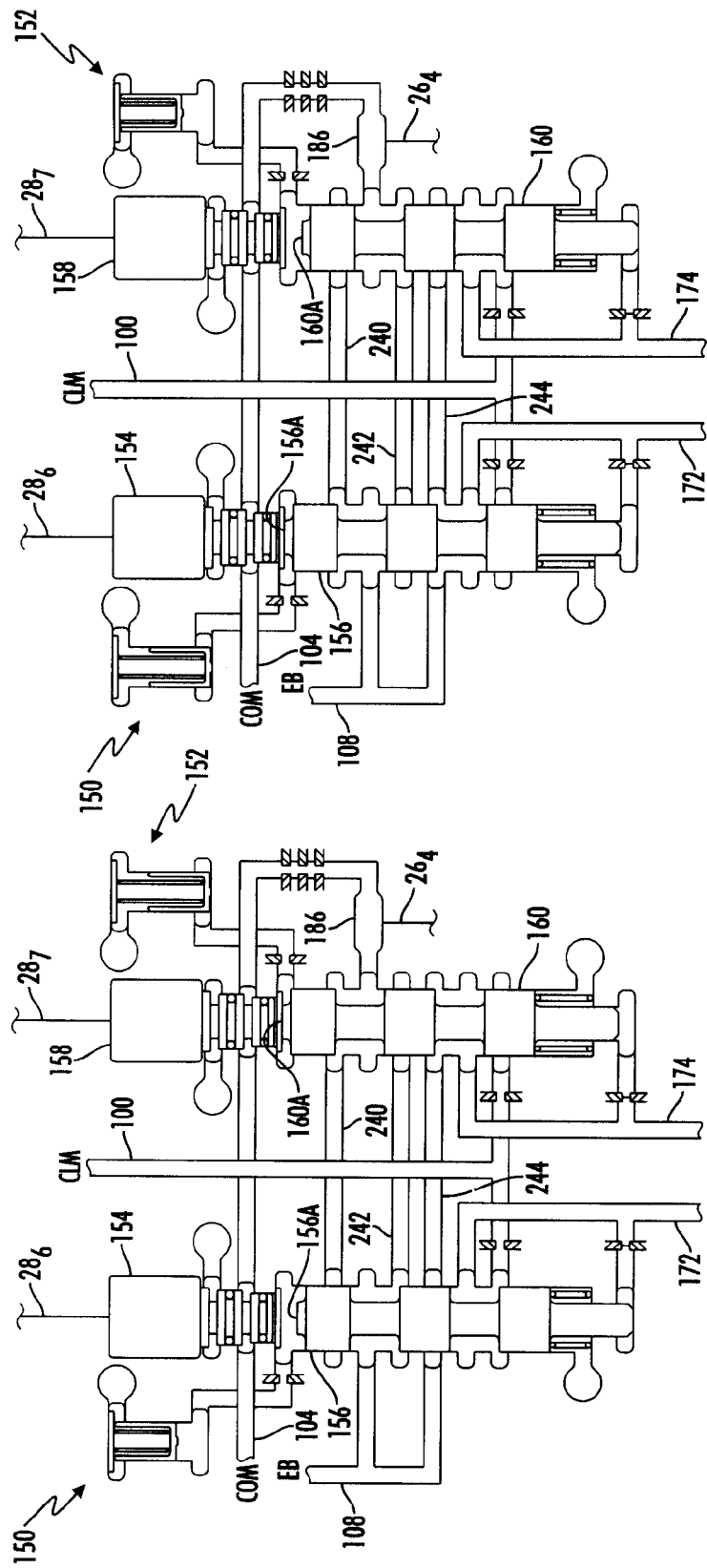
FIG. 10 is yet another magnified view of the clutch trim valves illustrated in FIG. 3 showing yet another operating state thereof.
FIG. 11 is a further magnified view of the clutch trim valves illustrated in FIG. 3 showing a further operating state thereof.

Referring to FIGS. 8-11, examples are shown of all possible combinations of operating states of he clutch trim valves 150 and 152 and their impact on the status or state of the pressure switch 186. When the clutch trim valves 150 and 152 are both de-stroked, for example as illustrated in FIG. 8, the spools 156 and 160 route the exhaust backfill, EB, to the pressure switch 186. The pressure switch 186 is responsive to EB to produce a low-valued output signal that the transmission control circuit 30 processes to determine the state or status of the pressure switch 186 as a low logic state, e.g., a "0." When the clutch trim valves 150 and 152 are both stroked, as illustrated in FIG. 9, the spools 156 and 160 likewise route the exhaust backfill, EB, to the pressure switch 186, in which case the transmission control circuit 30 determines the state or status of the pressure switch 186 as a low logic state, e.g., a "0." When the clutch trim valve 150 is stroked and the clutch trim valve 152 is de-stroked, as illustrated in FIG. 10, the spools 156 and 160 route the control main pressure, COM, to the pressure switch 186. The pressure switch 186 is responsive to COM to produce a high-valued output signal that the transmission control circuit 30 processes to determine the state or status of the pressure switch 186 as a high logic state, e.g., a "1." When the clutch trim valve 150 is de-stroked and the clutch trim valve 152 is stroked, as illustrated in FIG. 11, the spools 156 and 160 likewise route the control main pressure, COM, to the pressure switch 186, in which case the transmission control circuit 30 determines the state or status of the pressure switch 186 as a high logic state, e.g., a "1."

Returning again to FIG. 4, the process 200 advances from step 206 to step 208 where the transmission control circuit 30 is operable to compare the status of the pressure switches, determined at step 206, with expected pressure switch statuses based on the current operating mode of the transmission 14. As briefly described hereinabove, the transmission control circuit 30 generally has knowledge at any given time of the current operating mode, OM, of the transmission 14, and the operating mode, OM, of the transmission 14 at any given time generally defines the expected status of each of the pressure switches 184, 186 and 188. Illustratively, a table or other form of expected pressure switch status values by transmission operating mode is stored in the memory 32, and the transmission control circuit 30 executes step 208 by comparing the pressure switch statuses determined at step 206 with such a table or other form of expected pressure switch status values stored in the memory 32.

Referring to FIG. 5, an example is shown of one such expected pressure switch status table 230 that illustrates expected state or status values of the pressure switches 184, 186 and 188 for the various operating modes of the transmission 14. For example, in the neutral operating mode of the transmission 14, the clutch trim valves 150 and 152 will both be de-stroked as illustrated in FIG. 8, and the state or status of the pressure switch 186 will be "0" as shown for both the true neutral "TN" and in-range neutral "IRN" operating states in the table 230. The "true neutral" operating state, TN, of the transmission 14 is distinguishable in the illustrated embodiment from the in-range neutral operating state, IRN, in that the clutch control valves 184 and 188 in the former case are both de-stroked such that the pressure switches 184 and 188 are both "0," while in the latter case both clutch control valves 184 and 188 are stroked such that the pressure switches 184 and 188 are both "1."

In the non-neutral operating modes M1-M3 of the transmission 14, the clutch trim valves 150 and 152 are generally in opposite states, e.g., as illustrated in FIGS. 10 and 11, such that the state or status of the pressure switch 186 is a "1," as illustrated in the table 230 of FIG. 5. In these operating modes, the clutch control valves 162 and 96 may be in various combinations of states, and the states or status of the pressure switches 184 and 188 may thus be a "1" or a "0" depending upon the operating mode of the transmission at any given time, as also illustrated in FIG. 5.

In the mode transition state, MT, of the transmission 14, the clutch trim valves 150 and 152 will both be stroked as illustrated in FIG. 9, and the state or status of the pressure switch 186 will be "0" as shown in FIG. 5. In the mode transition state, MT, the clutch control valve 96 will normally be stroked such that the state or status of the pressure switch 188 is "1," and the clutch control valve 162 may be stroked or de-stroked depending upon which the modes the transmission is transitioning between. The state or the status of the pressure switch 184 may thus be a "0" or a "1," as illustrated in FIG. 5. Illustratively, the remaining combinations of statuses or states of the pressure switches 184 and 188 in the mode transition state, MT, may be used for fault or failure identification states, and further details relating to such states are provided in co-pending U.S. Patent Application Ser. No. 61/287,038, the disclosure of which has been incorporated herein by reference in its entirety.

Returning again to FIG. 4, the process 200 advances from step 208 to step 210 where the transmission control circuit 30 determines based on the comparison of step 208 whether a neutral fault or failure is detected. As illustrated in the pressure switch status table 230 of FIG. 5, the pressure switch 186 is expected to have a state or status of "0" when the transmission 14 is either in "true neutral" or "in-range neutral." Thus, if the comparison at step 208 reveals that the actual state of the pressure switch 186 is "0" when the transmission 14 is actually in one of the neutral conditions such that the state of the pressure switch 186 is expected to also be "0," then the transmission control circuit 30 determines at step 210 that no neutral fault is detected, and the process 200 advances to step 214. In one embodiment, if the comparison at step 208 reveals that the actual state of the pressure switch 186 is "1" when the transmission 14 is actually in "true neutral" or "in-range neutral" such that the state of the pressure switch 186 is expected to also be "0," then the transmission control circuit 30 determines at step 210 that a corresponding "true neutral" or "in-range neutral" fault is detected, and the process 200 advances to step 212 where the transmission control circuit 30 generates a fault signal. In the illustrated embodiment, the transmission control circuit 30 is configured to generate a fault signal by logging or storing an appropriate fault code, e.g., a "true neutral" fault code or an "in-range neutral" fault code, in the memory 32. Alternatively or additionally, the transmission control circuit 30 may be operable at step 212 to generate a fault signal by producing an electrically signal that is then used to activate an alarm. Examples of such alarms include, but should not be limited to, one or more conventional visual, audible and/or tactile, e.g., vibratory, indication devices. In any case, the process 200 advances from step 212 to step 220 where the process 200 ends or is returned to its calling routine.

The process 200 advances from the "NO" branch of step 210 to step 214 where the transmission control circuit 30 is operable to determine based on the comparison of step 208 whether a mode transition fault or failure is detected. As illustrated in the pressure switch status table 230 of FIG. 5, the pressure switch 186 is expected to have a state or status of "0" when the transmission 14 is in a mode transition, MT, operating state, i.e., when the transmission 14 is transitioning between adjacent ones of the non-neutral operating modes M1-M3. Thus, if the comparison at step 208 reveals that the actual state of the pressure switch 186 is "0" when the transmission 14 is actually in a mode transition state, MT, such that the state of the pressure switch 186 is expected to also be "0," then the transmission control circuit 30 determines at step 214 that no mode transition fault is detected, and the process 200 advances to step 216. If, on the other hand, the comparison at step 208 reveals that the actual state of the pressure switch 186 is "1" when the transmission 14 is actually in the mode transition state such that the state of the pressure switch 186 is expected to also be "0," then the transmission control circuit 30 determines at step 214 that a corresponding "mode transition" fault is detected, and the process 200 advances to step 212 where the transmission control circuit 30 generates a fault signal, e.g., by logging or storing a mode transition fault code in memory and/or activating a conventional alarm device.

The process 200 advances from the "NO" branch of step 214 to step 216 where the transmission control circuit 30 is operable to determine based on the comparison of step 208 whether a clutch trim valve fault or failure is detected. As illustrated in the pressure switch status table 230 of FIG. 5, the pressure switch 186 is expected to have a state or status of "0" when the transmission 14 is in a neutral condition or in a mode transition, MT, operating state, i.e., when the transmission 14 is transitioning between adjacent ones of the non-neutral operating modes M1-M3, and is otherwise expected to have a state or status of "1." As further illustrated in FIGS. 8-11, this means that the pressure switch 186 is expected to have a state or status of "0" when both of the clutch trim valves 150 and 152 are either de-stroked (FIG. 8) or stroked (FIG. 9), is expected to have a state or status of "1" when one of the clutch trim valves 150 and 152 is stroked while the other valve 150 and 152 is de-stroked. Thus, if the comparison at step 208 reveals that the actual state of the pressure switch 186 is "0" when the transmission 14 is actually in a neutral condition (e.g., "true neutral" or "in-range neutral") or a mode transition state, MT, such that the state of the pressure switch 186 is expected to also be "0," then the transmission control circuit 30 determines at step 216 that no clutch trim valve fault is detected, and the process 200 advances to step 218. Likewise, if the comparison at step 208 reveals that the actual state of the pressure switch 186 is "1" when the transmission 14 is actually in one of the operating modes M1-M3, such that the state of the pressure switch 186 is expected to also be "1," then the transmission control circuit 30 determines at step 216 that no clutch trim valve fault is detected, and the process 200 advances to step 218. If, in contrast, the comparison at step 208 reveals that the actual state of the pressure switch 186 is "1" when the transmission 14 is actually in a neutral condition or in the mode transition state such that the state of the pressure switch 186 is expected to be "0," or that the actual state of the pressure switch 186 is a "0" when the transmission 14 is actually in one of the operating modes M1-M3 such that the state of the pressure switch 186 is expected to be "1," then the transmission control circuit 30 determines at step 214 that a corresponding clutch trim valve fault is detected, and the process 200 advances to step 212 where the transmission control circuit 30 generates a fault signal, e.g., by logging or storing a mode transition fault code in memory and/or activating a conventional alarm device.

The process 200 advances from the "NO" branch of step 216 to step 218 where the transmission control circuit 30 is operable to determine based on the comparison of step 208 whether a clutch control valve fault or failure is detected. As illustrated in FIGS. 6-7, the pressure switch 184 is expected to have a state or status of "1" when the clutch control valve 162 is stroked (FIG. 6), and is expected to have a state or status of "0" when the clutch control valve 162 is de-stroked (FIG. 7). Likewise, the pressure switch 188 is expected to have a state or status of "1" when the clutch control valve 96 is stroked (FIG. 7), and is expected to have a state or status of "0" when the clutch control valve 96 is de-stroked (FIG. 6). Thus, if the comparison at step 208 reveals that the actual state of the pressure switch 184 is "0" when the state of the pressure switch 184 is expected to also be "0," or that the actual state of the pressure switch 184 is "1" when the state of the pressure switch 184 is expected to also be "1," then the transmission control circuit 30 determines at step 218 that no fault with or failure of the clutch control valve 162 is detected, and the process 200 loops back to step 204. Likewise, if the comparison at step 208 reveals that the actual state of the pressure switch 188 is "0" when the state of the pressure switch 188 is expected to also be "0," or that the actual state of the pressure switch 188 is "1" when the state of the pressure switch 188 is expected to also be "1," then the transmission control circuit 30 determines at step 218 that no fault with or failure of the clutch control valve 96 is detected, and the process 200 loops back to step 204.

If, on the other hand, the comparison at step 208 reveals that the actual state of the pressure switch 184 is "1" when the state of the pressure switch 184 is expected to be "0," or that the actual state of the pressure switch 184 is "0" when the state of the pressure switch 184 is expected to be "1," then the transmission control circuit 30 determines at step 218 that a fault with or failure of the clutch control valve 162 is detected, and the process 200 advances to step 212 where the transmission control circuit 30 generates a fault signal, e.g., by logging or storing a clutch control valve fault code associated with the clutch control valve 162 in memory and/or activating a conventional alarm device. Likewise, if the comparison at step 208 reveals that the actual state of the pressure switch 188 is "1" when the state of the pressure switch 188 is expected to be "0," or that the actual state of the pressure switch 188 is "0" when the state of the pressure switch 188 is expected to be "1," then the transmission control circuit 30 generates a fault signal, e.g., by logging or storing a clutch control valve fault code associated with the clutch control valve 96 in memory and/or activating a conventional alarm device.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A fault diagnostic method for an automatic transmission, the method comprising:
   monitoring, by a transmission control circuit, an operating state of a trim system, the trim system comprising a first trim valve having (i) a first operating state in which the first trim valve supplies a clutch engagement pressure to at least one clutch control valve via a first fluid passageway and (ii) a second operating state in which the first trim valve exhausts the first fluid passageway,
   determining, by the transmission control circuit, an expected operating state of the trim system based on current operating conditions of the transmission, and
   generating, by the transmission control circuit, a fault signal if the monitored operating state of the trim system is different from the expected operating state of the trim system.

2. The fault diagnostic method of claim 1 wherein generating a fault signal comprises storing a trim system fault code in a memory device.

3. The fault diagnostic method of claim 1 wherein determining an expected operating state of the trim system comprises determining that the trim system should be in a first operating state when the transmission is in neutral, and wherein generating a fault signal comprises generating a neutral fault signal if the monitored operating state of the trim system is different from the first operating state of the trim system when the transmission is in neutral.

4. The fault diagnostic method of claim 3 wherein generating the neutral fault signal comprises storing a neutral fault code in a memory device.

5. The fault diagnostic method of claim 1 wherein the transmission has a number of different operating modes,
and wherein determining an expected operating state of the trim system comprises determining that the trim system should be in a first operating state when the transmission is transitioning between adjacent ones of the number of different operating modes,
and wherein generating a fault signal comprises generating a mode transition fault signal if the monitored operating state of the trim system is different from the first operating state of the trim system when the transmission is transitioning between adjacent ones of the number of different operating modes.

6. The fault diagnostic method of claim 5 wherein generating the mode transition signal comprises storing a mode transition fault code in a memory device.

7. The fault diagnostic method of claim 1 wherein the at least one clutch control valve comprises first and second clutch control valves, and wherein the method further comprises:
monitoring an operating state of the first clutch control valve,
determining an expected operating state of the first clutch control valve based on current operating conditions of the transmission, and
generating a first clutch control valve fault signal if the monitored operating state of the first clutch control valve is different from the expected operating state of the first clutch control valve.

8. The fault diagnostic method of claim 7 wherein generating a first clutch control valve fault signal comprises storing a first clutch control valve fault code in a memory device.

9. The fault diagnostic method of claim 1 wherein the at least one clutch control valve comprises first and second clutch control valves, and wherein the method further comprises:
monitoring an operating state of the second clutch control valve,
determining an expected operating state of the second clutch control valve based on current operating conditions of the transmission, and
generating a second clutch control valve fault signal if the monitored operating state of the second clutch control valve is different from the expected operating state of the second clutch control valve.

10. The fault diagnostic method of claim 9 wherein generating a second clutch control valve fault signal comprises storing a second clutch control valve fault code in a memory device.

11. The fault diagnostic method of claim 1 wherein the trim system comprises:
a second trim valve having a first operating state in which the second trim valve supplies a clutch engagement pressure to the at least one clutch control valve via a second fluid passageway and a second operating state in which the second trim valve exhausts the second fluid passageway, and
a first pressure switch fluidly coupled to one of the first and second trim valves such that the first pressure switch is in a first operating state when the first and second trim valves both supply the clutch engagement pressure to the first and second fluid passageways respectively and also when the first and second trim valves both exhaust the first and second fluid passageways respectively, and is otherwise in a second operating state different from the first operating state,
wherein monitoring a state of the trim system comprises monitoring the operating state of the first pressure switch and determining an expected operating state of the trim system comprises determining an expected operating state of the first pressure switch.

12. The fault diagnostic method of claim 11 wherein generating a fault signal comprises storing a trim system fault code in a memory device if the monitored operating state of the first pressure switch is different from the expected operating state of the first pressure switch.

13. The fault diagnostic method of claim 11 wherein determining an expected operating state of the trim system comprises determining that the first pressure switch should be in the first operating state when the transmission is in true neutral,
and wherein generating a fault signal comprises generating a true neutral fault signal if the first pressure switch is in the second operating state when the transmission is in true neutral.

14. The fault diagnostic method of claim 13 wherein generating the true neutral fault signal comprises storing a true neutral fault code in a memory device.

15. The fault diagnostic method of claim 11 wherein determining an expected operating state of the trim system comprises determining that the first pressure switch should be in the first operating state when the transmission is in in-range neutral,
and wherein generating a fault signal comprises generating an in-range neutral fault signal if the first pressure switch is in the second operating state when the transmission is in in-range neutral.

16. The fault diagnostic method of claim 15 wherein generating the in-range neutral fault signal comprises storing an in-range neutral fault code in a memory device.

17. The fault diagnostic method of claim 11 wherein the transmission has a number of different operating modes,
and wherein determining an expected operating state of the trim system comprises determining that the first pressure switch should be in the first operating state when the transmission is transitioning between adjacent ones of the number of different operating modes,
and wherein generating a fault signal comprises generating a mode transition fault signal if the first pressure switch is in the second operating state when the transmission is transitioning between adjacent ones of the number of different operating modes.

18. The fault diagnostic method of claim 17 wherein generating the mode transition fault signal comprises storing a mode transition fault code in a memory device.

19. The fault diagnostic method of claim 11 wherein the at least one clutch control valve comprises:
a first control valve fluidly coupled to the first trim valve via the first fluid passageway and also to first and second friction engagement devices,
a second control valve fluidly coupled to the first and second trim valves via the first and second fluid passageways and also to a third friction engagement device,
a second pressure switch fluidly coupled to the first control valve such that the second pressure switch is in a first operating state when the first control valve is de-stroked and is in a second operating state when the first control valve is stroked, and a third pressure switch fluidly coupled to the second control valve such that the third pressure switch is in a first operating state when the second control valve is de-stroked and is in a second operating state when the second control valve is stroked, wherein the method further comprises:

monitoring the operating state of the second pressure switch, determining an expected operating state of the second pressure switch based on current operating conditions of the transmission, and generating a first control valve fault signal if the monitored operating state of the second pressure switch is different from the expected operating state of the second pressure switch.

20. The fault diagnostic method of claim 19 wherein generating a first control valve fault signal comprises storing a first control valve fault code in a memory device.

21. The fault diagnostic method of claim 11 wherein the at least one clutch control valve comprises:

a first control valve fluidly coupled to the first trim valve via the first fluid passageway and also to first and second friction engagement devices, a second control valve fluidly coupled to the first and second trim valves via the first and second fluid passageways and also to a third friction engagement device, a second pressure switch fluidly coupled to the first control valve such that the second pressure switch is in a first operating state when the first control valve is de-stroked and is in a second operating state when the first control valve is stroked, and a third pressure switch fluidly coupled to the second control valve such that the third pressure switch is in a first operating state when the second control valve is de-stroked and is in a second operating state when the second control valve is stroked, wherein the method further comprises:

monitoring the operating state of the third pressure switch, determining an expected operating state of the third pressure switch based on current operating conditions of the transmission, and generating a second control valve fault signal if the monitored operating state of the third pressure switch is different from the expected operating state of the third pressure switch.

22. The fault diagnostic method of claim 21 wherein generating a second control valve fault signal comprises storing a second control valve fault code in a memory device.

23. A system for an automatic transmission, the system comprising:

a first trim valve having a first operating state in which the first trim valve supplies a clutch engagement pressure to at least one clutch control valve via a first fluid passageway and a second operating state in which the first trim valve exhausts the first fluid passageway, a second trim valve having a first operating state in which the second trim valve supplies the clutch engagement pressure to the at least one clutch control valve via a second fluid passageway and a second operating state in which the second trim valve exhausts the second fluid passageway, and a first pressure switch fluidly coupled to one of the first and second trim valves such that the first pressure switch is in a first operating state when the first and second trim valves both supply the clutch engagement pressure to the first and second fluid passageways respectively and also when the first and second trim valves both exhaust the first and second fluid passageways respectively, and is otherwise in a second operating state different from the first operating state.

24. The system of claim 23 further comprising a control circuit including a memory having instructions stored therein that are executable by the control circuit to monitor the operating state of the first pressure switch, to determine an expected operating state of the first pressure switch based on current operating conditions of the transmission, and to generate a fault signal if the monitored operating state of the first pressure switch is different from the expected operating state of the first pressure switch.

25. The system of claim 24 wherein the instructions stored in the memory further include instructions executable by the control circuit to store a trim system fault code in the memory if the monitored operating state of the first pressure switch is different from the expected operating state of the first pressure switch.

26. The system of claim 24 wherein the instructions stored in the memory further include instructions executable by the control circuit to determine an expected operating state of the first pressure switch based on current operating conditions of the transmission by determining that the first pressure switch should be in the first operating state when the transmission is in true neutral, in-range neutral or transitioning between adjacent ones of a number of different operating modes of the transmission.

27. The system of claim 23 wherein the at least one clutch control valve comprises:

a first control valve fluidly coupled to the first trim valve via the first fluid passageway and also to first and second friction engagement devices, and a second control valve fluidly coupled to the first and second trim valves via the first and second fluid passageways and also to a third friction engagement device, and wherein the system further comprises a second pressure switch fluidly coupled to the first control valve such that the second pressure switch is in a first operating state when the first control valve is de-stroked and is in a second operating state when the first control valve is stroked, and a control circuit including a memory having instructions stored therein that are executable by the control circuit to monitor the operating state of the second pressure switch, determine an expected operating state of the second pressure switch based on current operating conditions of the transmission, and generate a first control valve fault signal if the monitored operating state of the second pressure switch is different from the expected operating state of the second pressure switch.

28. The system of claim 27 further comprising a third pressure switch fluidly coupled to the second control valve such that the third pressure switch is in a first operating state when the second control valve is de-stroked and is in a second operating state when the second control valve is stroked, and wherein the instructions stored in the memory further include instructions that are executable by the control circuit to monitor the operating state of the third pressure switch, determine an expected operating state of the third pressure switch based on current operating conditions of the transmission, and generate a second control valve fault signal if the monitored operating state of the third pressure switch is different from the expected operating state of the third pressure switch.

29. A system for detecting clutch-related faults in an automatic transmission, the system comprising:
a trim system configured to selectively supply clutch engagement pressure to and exhaust first and second fluid passageways,
a first control valve fluidly coupled to the trim system via the first fluid passageway and also to first and second friction engagement devices,
a second control valve fluidly coupled to the trim system via the first and second fluid passageways and also to a third friction engagement device,
a first pressure switch fluidly coupled to the first control valve such that the first pressure switch is in a first operating state when the first control valve is de-stroked and is in a second operating state when the first control valve is stroked,
a second pressure switch fluidly coupled to the second control valve such that the second pressure switch is in a first operating state when the second control valve is de-stroked and is in a second operating state when the second control valve is stroked, and
a control circuit including a memory having instructions stored therein that are executable by the control circuit to monitor the operating state of the first pressure switch, determine an expected operating state of the first pressure switch based on current operating conditions of the transmission, and generate a first control valve fault signal if the monitored operating state of the first pressure switch is different from the expected operating state of the first pressure switch.

30. The system of claim 29
wherein the instructions stored in the memory further include instructions that are executable by the control circuit to monitor the operating state of the second pressure switch, determine an expected operating state of the second pressure switch based on current operating conditions of the transmission, and generate a second control valve fault signal if the monitored operating state of the second pressure switch is different from the expected operating state of the second pressure switch.

* * * * *